(12) United States Patent
Piva

(10) Patent No.: US 8,852,369 B2
(45) Date of Patent: Oct. 7, 2014

(54) METHOD AND SYSTEM OF MANUFACTURING MULTILAYER COATING FOR DECORATION OF SURFACES

(75) Inventor: Alberto Piva, Soave (IT)

(73) Assignee: All Print S.R.L., Arcole (VR) (IT)

( * ) Notice: Subject to any disclaimer, the term of this patent is extended or adjusted under 35 U.S.C. 154(b) by 0 days.

(21) Appl. No.: 13/285,228

(22) Filed: Oct. 31, 2011

(65) Prior Publication Data

US 2013/0105059 A1    May 2, 2013

(51) Int. Cl.
| | | |
|---|---|---|
| *B29C 65/00* | (2006.01) | |
| *B31B 1/60* | (2006.01) | |
| *B32B 37/00* | (2006.01) | |
| *B27G 11/02* | (2006.01) | |
| *B29C 65/02* | (2006.01) | |
| *B31F 5/04* | (2006.01) | |
| *G05G 15/00* | (2006.01) | |
| *B32B 38/04* | (2006.01) | |
| *B05C 11/02* | (2006.01) | |
| *B32B 37/02* | (2006.01) | |
| *B05C 13/00* | (2006.01) | |
| *B05D 5/10* | (2006.01) | |
| *B32B 38/00* | (2006.01) | |
| *B32B 37/24* | (2006.01) | |

(52) U.S. Cl.
CPC ......... *B05C 11/02* (2013.01); *B32B 2038/0076* (2013.01); *B32B 2451/00* (2013.01); *B32B 37/02* (2013.01); *B32B 38/164* (2013.01); *B05C 13/00* (2013.01); *B32B 2037/243* (2013.01); *B05D 5/10* (2013.01)
USPC ........ 156/60; 156/379.6; 156/349; 156/272.2

(58) Field of Classification Search
USPC .................... 156/60, 182, 283, 292
See application file for complete search history.

(56) References Cited

U.S. PATENT DOCUMENTS

| | | | | |
|---|---|---|---|---|
| 3,942,261 | A * | 3/1976 | Hirata et al. | 34/287 |
| 6,336,998 | B1 | 1/2002 | Wang | |
| 6,479,431 | B1 * | 11/2002 | McFall et al. | 503/200 |
| 6,676,792 | B1 * | 1/2004 | Fenzi | 156/240 |
| 2003/0021918 | A1 * | 1/2003 | McKillip | 428/34.1 |
| 2004/0137249 | A1 * | 7/2004 | Kamiyama | 428/483 |
| 2007/0031645 | A1 * | 2/2007 | Wilde et al. | 428/204 |
| 2008/0286500 | A1 | 11/2008 | Sussner et al. | |
| 2009/0011165 | A1 * | 1/2009 | Takahashi et al. | 428/41.3 |

FOREIGN PATENT DOCUMENTS

| | | | |
|---|---|---|---|
| EP | 1930179 | | 6/2008 |
| IT | WO0030868 | * | 6/2000 |
| WO | 0030868 | | 6/2000 |

* cited by examiner

*Primary Examiner* — Richard Crispino
*Assistant Examiner* — Matthew Hoover
(74) *Attorney, Agent, or Firm* — Themis Law

(57) ABSTRACT

A method of manufacturing a multilayer coating for decoration of surfaces includes the successive steps of providing a supporting substrate, applying a protective layer on that substrate, applying at least one first decorative layer on the protective layer to transfer a first ornamental patter thereto, depositing at least one adhesive layer on the first decorative layer to form a multilayer coating configured to be applied on a surface to be decorated. The substrate is a film of a polymeric material configured to be removed from the protective layer after application of the multilayer coating on the surface to be decorated. A system of manufacturing a multilayer coating for the decoration of surfaces.

13 Claims, 3 Drawing Sheets

METHOD AND SYSTEM OF MANUFACTURING MULTILAYER COATING FOR DECORATION OF SURFACES

FIELD OF THE INVENTION

The present invention generally finds application in the field of surface treatments, and particularly relates to a line and a method for making multilayer coating designed to be applied to flat or curved surfaces of panels, furniture surfaces, floors, profiles or sheets, particularly for door and window products in general, for decoration thereof.

BACKGROUND ART

Various techniques are known for decoration of flat or curved surfaces, such as furniture surfaces or floors or profiles, sheets and similar product, e.g. designed for assembly of door and window products.

Prior art techniques generally require one or more decorative layers, consisting of paints or other pigmented liquids, to be laid on the surface to be decorated.

These layers are distributed over the surface to be decorated either uniformly or with predetermined patterns. The various overlapped layers define the final decorative pattern.

Furthermore, an initial adhesive layer, or primer, may be applied to the surface to be decorated, to facilitate stable connection of the decorative layers thereto.

Likewise, a varnish or other transparent material may be applied above the decorative layers, with the purpose of finishing and protecting the decorative layers.

Typically, in prior art, the various layers are applied one above the other directly on the surface to be decorated, from the adhesive layer through all decorative layers proper.

Accordingly, the line shall have a number of workstations for laying the layers in the predetermined order.

Otherwise, a single workstation, typically the decorating station may be used for laying two or more layers, but still in sequential order.

In any case, the surface to be decorated is required to be submitted to several machine steps, each involving a time for applying and drying the deposited layer, thereby excessively increasing the overall process time.

Furthermore, if a single decorating station is used for depositing the various decorative layers, the decorated product must be picked up from the exit of such station and carried back to the entry thereof.

This requires particular work and sufficient spaces, thereby adding complexity to the process and increasing the overall space requirements for the system.

A further drawback of all prior art solutions is that the multilayer coating is applied to the surface to be decorated at the same time as it is formed.

Therefore, the presence of the decorated product is always required, which causes an increase of the overall costs.

Also, in case of errors in layer production, defects will be reflected on the product, which will have to be discarded or reprocessed.

SUMMARY OF THE INVENTION

The object of the present invention is to overcome the above drawbacks, by providing a method and a system for making a multilayer coating for decoration of surfaces that is highly efficient and relatively cost-effective.

A particular object is to provide a method of making a multilayer decoration coating that allows relatively quick production of the coating.

Another object of the present invention is to provide a method of making a multilayer coating that can be immediately stored without waiting for drying thereof, and that can be later applied to any surface to be decorated.

Yet another object is to provide a system for making multilayer coating that ensures a relatively high throughput and has a considerably reduced size.

Another important object of the present invention is to provide a system for making multilayer coating that has a considerably lower power consumption and reduced labor requirements.

These and other objects, as better explained hereafter, are fulfilled by a method of making multilayer coating as defined in claim 1.

This peculiarity of the invention will provide a multilayer coating for decoration of surfaces in a quick and simple manner, at a high rate per unit of time.

In a particular embodiment, a multilayer coating may include at least one lower adhesive layer, one or more intermediate decoration layers, at least one protective layer for protecting the decorative layers, which protective layer is preferably optically transparent or translucent, and a cover layer lying on the protective layer and comprising a film made of a polymeric material, which is designed to be removed after application of the coating to the surface to be decorated.

In a further aspect, the invention relates to a system for making multilayer coating as defined in claim 13.

Advantageous embodiments of the method and system are defined by the dependent claims.

BRIEF DESCRIPTION OF THE DRAWINGS

Further features and advantages of the invention will become more apparent upon reading of the following detailed description of a few preferred non limiting embodiments of a method and a system for making multilayer coating according to the present invention, and a multilayer coating that can be obtained by such method and/or system, which are described by way of a non limiting example with the help of the accompanying drawings in which.

DETAILED DESCRIPTION OF A PREFERRED EMBODIMENT

Figure 1:
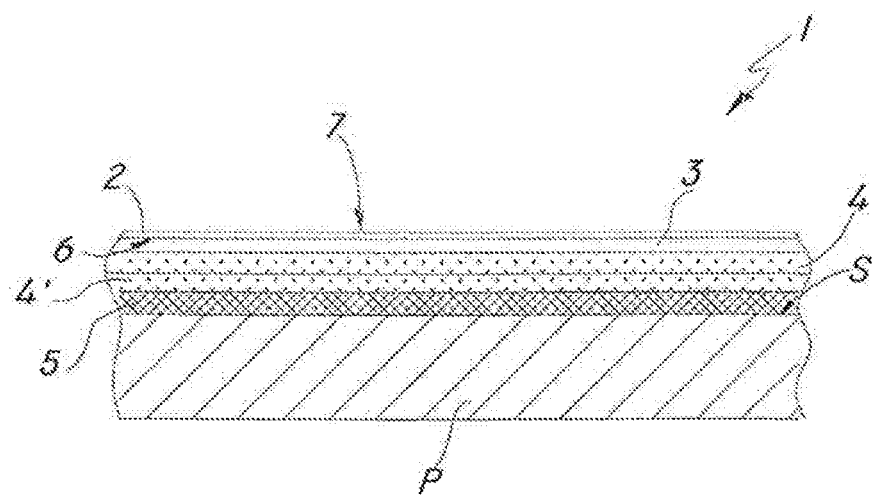
FIG. 1 is a cross sectional view of a multilayer coating that can be obtained by the method and/or a system of the invention.

FIG. 1 shows a multilayer coating, generally designated by numeral 1, for decoration of a flat or curved surface S of a panel P, sheet, profile or similar product.

The surface S may be an exposed surface of a furniture top, a floor or a door or window element.

The surface S may be made of any material, of polymeric, metal or natural nature, such as wood.

A multilayer coating 1 may include, from top to bottom, a cover layer 2, a protective layer 3, at least one decorative layer 4 with an ornamental pattern, not shown, which is designed to be transferred to the surface to be decorated S, an adhesive layer 5 for anchoring the coating 1 to the surface to be decorated S.

The illustrated embodiment includes two intermediate decorative layers 4, 4' having corresponding ornamental patterns that will generally define the decoration to be transferred to the surface S.

Nevertheless, more than two decorative layers 4, 4', ... not necessarily of identical materials, may be provided.

The cover layer 2 may be a polymeric film, having the purpose of protecting the underlying layers and designed to be removed after application of the cover 1 to the surface S to be decorated.

By way of non limiting example, the film 2 may be made of polyethylene, polyester, polyamide or the like.

The film 2 will have a relatively small thickness, e.g. ranging from 10 μm to 50 μm, preferably from 5 μm to 30 μm.

The film 2 may be either transparent or translucent and its degree of gloss will influence the final gloss of the coating 1.

Furthermore, a dye, such as a paint or an ink may be distributed uniformly or with a predetermined pattern on the unexposed surface of the cover layer, and is designed to be transferred to the protective layer 3 after removal of the cover layer 2.

Obviously, the material that forms the dye shall be compatible with the material that forms the protective layer 3, whereas the latter shall be preferably incompatible with the material of the film 2 to allow removal thereof without affecting the surface quality of the coating.

Advantageously, the selection of the materials for the polymeric film 2 and the underlying layer 3 will allow the film 2 to be reused after removal.

As used herein, the term "compatible materials" or derivatives thereof shall be intended to indicate materials having a chemical and/or physical compatibility with each other, i.e. materials that, while in joined relationship, provide a junction adapted to support the transfer of tensile or shear stresses through the contact surface. The highest compatibility is thus achieved between identical materials or having the same matrix base.

As a protective layer 3 a varnish may be used, with a substantially uniform thickness.

The varnish may be, for instance, an UV varnish adapted for air drying and cross-linking when exposed to UV radiation.

The decorative layers 4, 4', ... may be obtained by depositing predetermined amounts of any paint or ink.

Advantageously, the paints in use may be water-based, to avoid the provision of a vapor vent system, which would be otherwise required in case of solvent-based paints.

The paints or inks that can be used for this purpose may be also adapted for air drying and/or UV cross-linking.

Finally, the adhesive layer 5 may be composed of a heat-seal adhesive, such as a UV varnish or paint, which is adapted for air drying and UV cross-linking.

Figure 2:
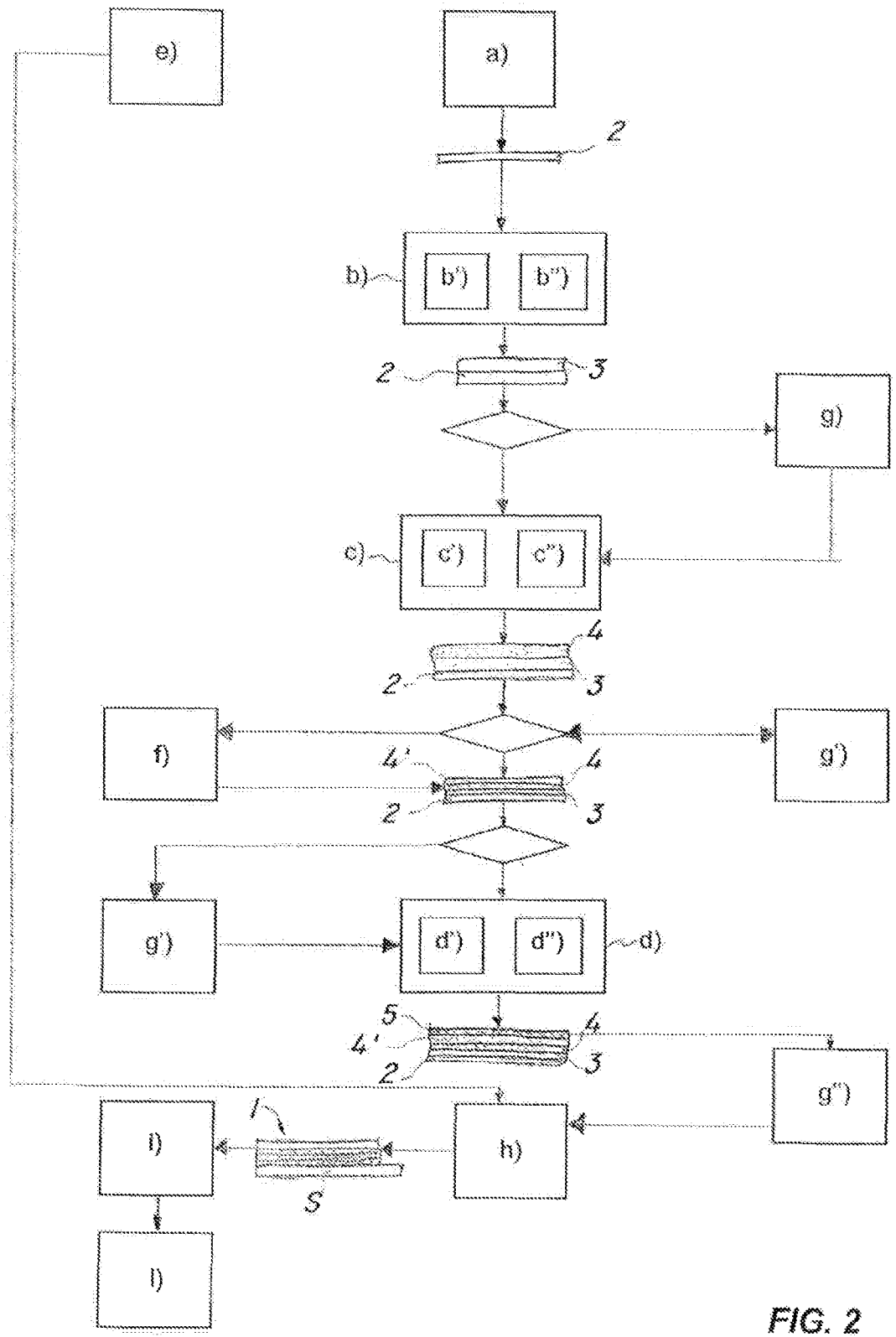
FIG. 2 is a diagram illustrating a method of the invention.

A multilayer coating 1 as described above may be obtained by a method of the present invention, as schematically shown in FIG. 2, which comprises the successive steps of a) providing a supporting substrate 2 with a top surface 6 and a bottom surface 7, b) applying a protective layer 3 on the top surface 6 of the substrate 2, c) applying at least one first decorative layer 4 on the protective layer 3 to transfer a first ornamental pattern thereto, d) depositing an adhesive layer 5 on the first decorative layer 4.

According to a peculiar feature of the invention, the substrate 2 is a film of a polymeric material designed to be removed from the protective layer 3 after application of the multilayer coating 1 on the surface to be decorated S.

In practice, the supporting substrate 2 constitutes the cover layer as defined above and its bottom surface 7 constitutes the exposed surface thereof.

The method may further include the step e) of continuously feeding the polymeric film 2 in a predetermined direction.

Particularly, the feeding step e) may be carried out at the same time as the steps b) and c) in which the protective layer 3 and the first decorative layer 4 are applied.

Furthermore, the feeding step e) may be also carried out at the same time as the step d) of depositing the adhesive layer 5.

Thus, the whole process of making the multilayer coating 1 may be carried out in a very simple and quick manner, while ensuring a considerably increased throughput as compared with prior art solutions.

The step b) of applying the protective layer 3 may include a step b') of picking up an optically transparent or translucent varnish and a later step b") of distributing the latter on the polymeric film 2.

Likewise, the step c) of applying the first decorative layer 4 may also include a step c') of picking up a pigmented liquid, such as a paint or an ink, and a later step c") of distributing the pigmented liquid on the protective film 3.

A further step f) may be also provided, for applying at least one second decorative layer 4' on the first layer 4.

The second decorative layer 4' may have a second ornamental pattern, which is designed to define, with the first ornamental pattern associated with the first layer 4 and the decoration, if any, released by the film 2, a decoration for the surface to be decorated S.

The final decoration may be either polychromatic or monochromatic and may consist of particular graphic effects, such as wood-like grains or the like, or of a simple uniform color of the coating.

Without limiting the scope of the present invention, the method may include additional steps for applying further overlapped decorative layers.

The step d) of depositing the adhesive layer 5 may include a step d') of picking up an adhesive or varnish having such function and a later step d") of applying the adhesive on the last of the decorative layers 4, 4', ... previously applied.

The liquids that form the various layers may be distributed by corresponding impression cylinders whose outer surfaces may be substantially smooth or engraved with predetermined patterns, or have a predetermined roughness.

Particularly, the steps of applying pigmented liquids or paints for forming the decorative layers 4, 4', ... may be carried out by irregular distribution thereof, to obtain the predetermined ornamental patterns.

The method of the invention may also include one or more steps g), g'), g"), ... in which the liquids or paints distributed in the various steps are dried.

Advantageously, a drying step g') may be provided after each step of application or distribution of the layers 3, 4, 4', 5.

The drying steps g), g'), g"), ... may involve the passage of the various layers 3, 4, 4', 5 through drying areas at temperatures T preferably ranging from 30° to 150°.

Preferably, the decorative layers 4, 4', ... may be dried at temperatures T preferably ranging from 30° to 130° and preferably from 30° to 70°.

In particular embodiments of the method, the drying steps g), g'), g"), ... may involve the passage of the layers 3, 4, 4', 5 through drying areas at increasing temperatures.

For example, one or more of the drying steps g), g'), g"), ... may involve the passage of the distributed liquid or paint through a first area at a temperature from 20° to 30°, then through a second area at a temperature from 50° to 70° or even to 130° and possibly, in case of more intensive drying, through a third drying area, at temperatures to 100° or even to 150°.

The coating 1 so obtained may be wound into rolls of predetermined size and stored for later use.

Application of the coating 1, cut to size, to the surface to be decorated S may include a step h) in which the multilayer coating 1 is placed on the surface to be decorated S with the adhesive layer 5 in contact therewith.

This step may be followed by a step i) in which the coating 1 on the surface to be decorated S is stabilized.

Advantageously, the positioning h) and stabilization i) steps may be performed substantially at the same time, for quick and safe application.

For instance, the stabilization step i) on the coating 1 may be performed by calendering, at predetermined adequate pressure and temperature values, allowing the adhesive of the adhesive layer 5 to set and ensure its sticking action.

At the end of these steps, a final step l) may be provided, in which the various layers of the coating 1 are at least partially polymerized or cured.

The polymerization step l) may involve the passage of the surface S decorated with the coating 1 through a UV oven or the like, not shown.

In a further aspect, the invention relates to a system (or a plant) for making multilayer coating for decoration of surfaces, which is adapted to implement the above method.

Figure 3:
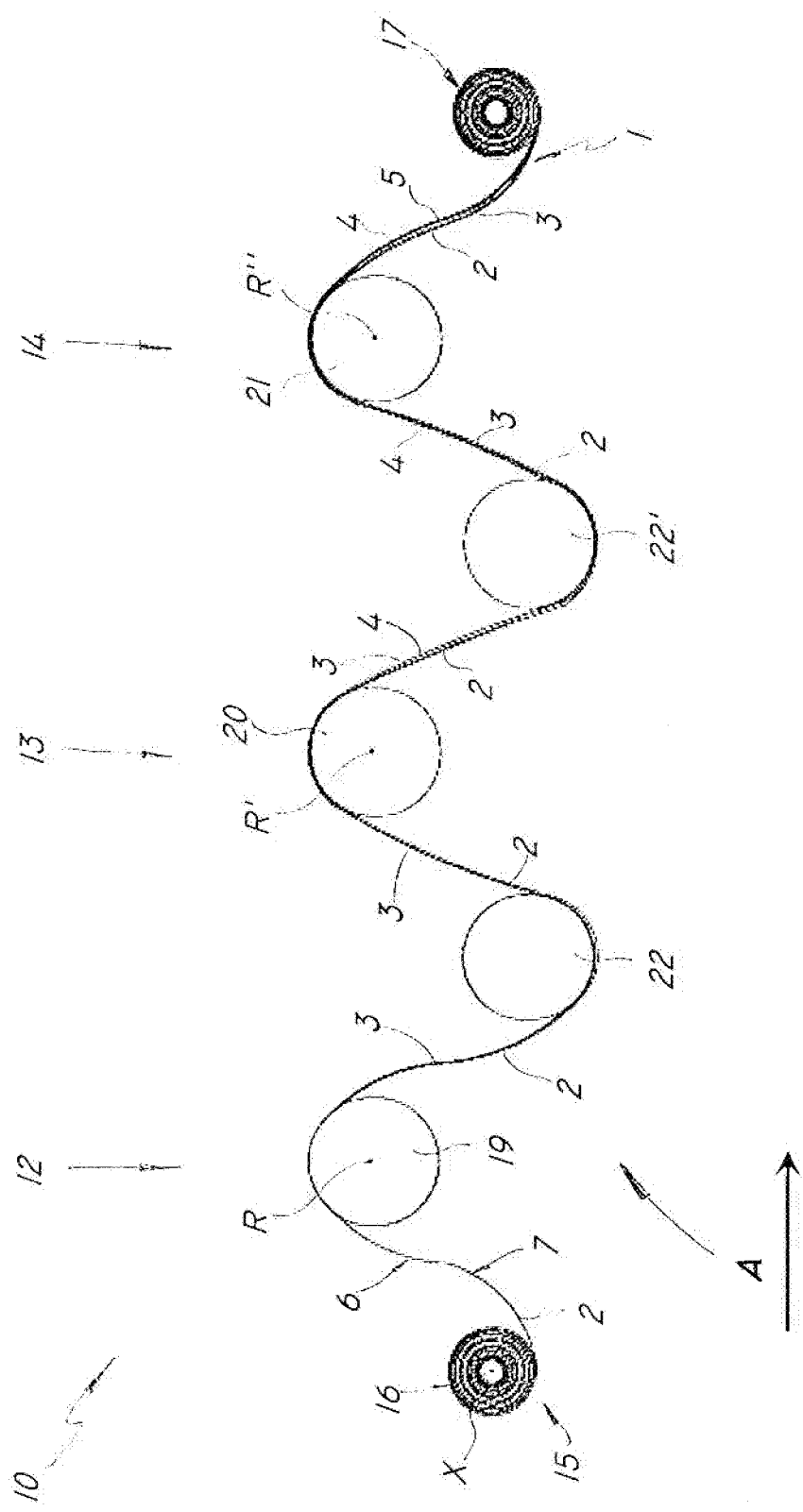
FIG. 3 is a lateral schematic view of a system of the invention.

A system of the invention, whose basic parts are schematically shown in FIG. 3, and which is generally designated by numeral 10, will include a supporting surface 11 defining a feeding path A, a first station 12 for depositing a protective layer 3 on the supporting surface 11, at least a second station 13 for depositing at least one first decorative layer 4 provided with a first ornamental pattern to be transferred to a surface to be decorated S, a third station 14 for depositing an adhesive layer 5 on the first decorative layer 4 or the upper decorative layer.

The system 10 is characterized in that the first 12, second 13 and third 14 stations are successively arranged along the feeding path A.

Furthermore, the supporting surface 11 comprises a polymeric film 3 having a free top surface 6 which is adapted to receive the various layers, continuous feeding means 15 being also provided for feeding the polymeric film 3 along the feeding path A through the various stations.

The feeding means 15 may include a motorized axis X for rotatably supporting a roll 16 of polymeric film 3 and means, not shown, for unwinding and guiding the film along the feeding path A.

The motorized axis X may be associated, as is known in the art, with a quick roll changing mechanism, not shown, for changing the roll 16.

Each of the liquid applying stations 12, 13, 14 may include a reservoir, not shown, which is adapted to contain the corresponding liquid to be distributed and a cylinder or roller 19, 20, 21 for picking up and transferring the liquid over the top surface 6 of the film 3 or the previously applied layer.

According to an alternative configuration, at least one of the reservoirs may be replaced by a different device for transferring the liquid or paint to the corresponding cylinder, the device being selected from those commonly used in painting systems, such as spray devices.

Conveniently, the cylinders 19, 20, 21 may be successively arranged along the feeding path A for the film 3 with their axes of rotation R, R', R" substantially horizontal.

The system may also include a plurality of return rollers 22, 22', ... interposed between the cylinders 19, 20, 21 to define therewith a curvilinear feeding path A for the film 3.

The axes of rotation R, R', R" of the cylinders 19, 20, 21 may be vertically offset to define a substantially curvilinear feeding path A for the polymeric film 3.

Furthermore, the outer lateral surfaces of the cylinders 19, 20, 21 and the return rollers 22, 22' may at least partially define the guide means for the film 3.

According to a preferred, non limiting configuration of the system, the outer lateral surfaces of the cylinders 19 and 21 of the first 12 and third 14 stations may be substantially uniform, for instance they may be smooth or have a predetermined even roughness, or a lattice-like engraving.

For instance, engravings may have a depth substantially ranging from 40 μm to 140 μm and preferably from 60 μm to 750 μm.

The cylinder 20 of the second station 14 may have an outer lateral surface with a plurality of relieves and/or recesses defining a decorative engraving to distribute the pigmented liquid according to a first predetermined ornamental pattern.

Preferably, the system 10 may include two or more successive decorating stations 13 along the feeding path A.

The decorating stations 13 may be interposed between the first 12 and third 14 stations, to apply corresponding overlapped decoration layers 4, 4' ....

Each of the stations that form the system 10 may also include more than one distribution cylinder associated with a single reservoir or to multiple reservoirs for the liquids to be distributed.

One or more, preferably all of the layer applying stations, may be followed by a drying unit, not shown, for at least partially drying the layers.

The drying units may be divided into multiple sections, e.g. two or three sections, for drying the layers at progressively increasing temperatures, as described above concerning the method of the invention.

The system 10 may end with a winding station 22 for winding the coating 1 into a roll 17, which may be equipped with a quick change device, not shown.

Figure 4:
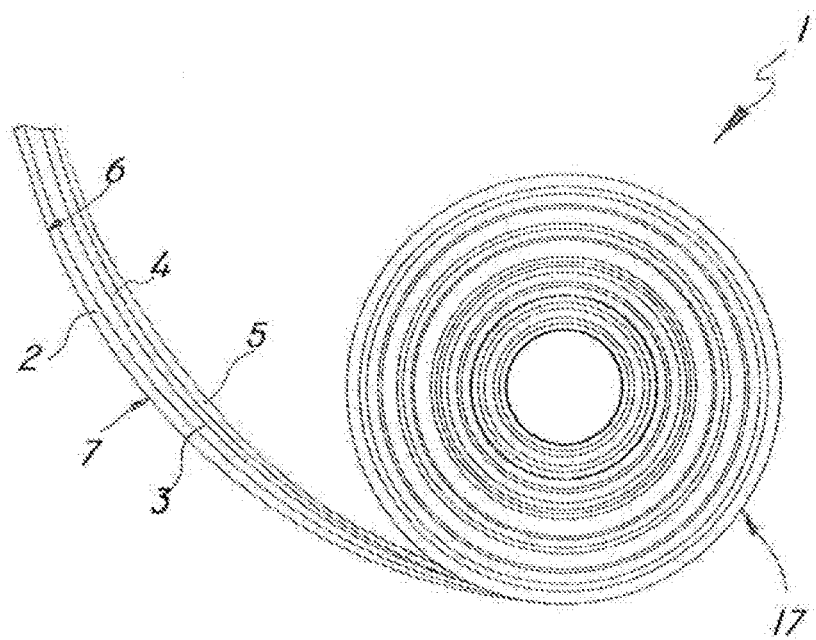
FIG. 4 is an enlarged view of a detail of FIG. 3.

FIG. 4 shows a detail of the coating 1 as it exits the last station of the system 10, in this case the third adhesive layer applying station 14, immediately before winding thereof into the final roll 17 for storage.

The above disclosure clearly shows that the invention fulfills the intended objects and particularly meets the requirement of providing a method and a system for making a multilayer coating adapted to be applied to surfaces to be decorated, that has high anchoring stability and improved surface quality as compared with the prior art.

The method and system of the invention are susceptible to a number of changes or variants, within the inventive concept disclosed in the appended claims. All the details thereof may be replaced by other technically equivalent parts, and the materials may vary depending on different needs, without departure from the scope of the invention.

While the method and system have been described with particular reference to the accompanying figures, the numerals referred to in the disclosure and claims are only used for the sake of a better intelligibility of the invention and shall not be intended to limit the claimed scope in any manner.

The invention claimed is:

1. A method of decorating surfaces with a multilayer coating, comprising:
   manufacturing a multilayer coating (1); and
   applying said multilayer coating (1) to a surface to be decorated, wherein the step of manufacturing said multilayer coating (1) comprises in sequence the steps of:
a) providing a supporting substrate (2);
b) applying a protective layer (3) in liquid form on said supporting substrate (2);
c) applying at least one first decorative layer (4) in liquid form on said protective layer (3) to transfer a first ornamental pattern to said protective layer; and
d) depositing at least one adhesive layer (5) on said at least one first decorative layer (4) to produce said multilayer coating (1),
wherein the step of applying said multilayer coating (1) comprises in sequence the steps of:
h) positioning said multilayer coating (1) on said surface to be decorated (S) with said at least one adhesive layer (5) disposed in contact therewith;
i) stabilizing said multilayer coating (1) positioned on said surface to be decorated (S);
l) curing said multilayer coating (1),
wherein said supporting substrate (2) is a film of a polymeric material,
wherein said step of stabilizing (i) is performed by rolling said multilayer coating (1) on said surface to be decorated (S) at a predetermined pressure and temperature sufficient to activate and set of said at least one adhesive layer (5) and cause an adhesive action on said surface to be decorated (S); and
wherein said supporting substrate is finally removed from said protective layer (3) after the step of applying said multilayer coating (1) on said surface to be decorated (S) to expose said protective layer (3) and said at least one first decorative layer (4).

2. The method as claimed in claim 1, further comprising a step (e) of continuous feeding of said supporting substrate (2) along a predetermined feeding path (A), said feeding step (e) being carried out simultaneously to said steps (b, c) of applying said protective layer (3) and said at least one first decorative layer (4) and to said step (d) of depositing said at least one adhesive layer (5).

3. The method as claimed in claim 1, wherein said step (b) of applying said protective layer (3) comprises a step (b') of distributing an optically transparent or translucent paint on said film.

4. A method as claimed in claim 1, wherein said step (c) of applying said first decorative layer comprises a step (c') of distributing a pigmented liquid on said protective layer (3).

5. The method as claimed in claim 1, further comprising an additional step (f) of application of at least one second decorative layer (4') on said first decorative layer (4), said at least one second decorative layer (4') being provided with a second ornamental pattern designed to define a decoration for a surface to be decorated (S) with said first ornamental pattern of said first decorative layer (4).

6. The method as claimed in claim 5, wherein said step (d) of depositing said at least one adhesive layer (5) comprises a step (d") of distributing an adhesive on one of said first and second decorative layers (4, 4', ... ).

7. The method as claimed in claim 6, further comprising the step of distributing a paint, a pigmented liquid or an adhesive with one or more cylinders (19, 20, 21).

8. The method as claimed in claim 5, wherein said steps of applying said at least one first and said at least one second decorative layer (4, 4') provides for an irregular distribution of pigmented liquids layers underneath to realize said first and said second ornaments patterns.

9. The method as claimed in claim 5, further comprising at least one step (g, g', g") of drying at least one of said decorative, first or second decorative layers (3, 4, 4', 5), said at least one drying step (g, g', g") being carried out at temperature comprised between 30° and 150° C.

10. The method as claimed in claim 1, wherein an upper surface (6) of said supporting substrate (2) is provided with a third ornamental pattern designed to be transferred to said protective layer (3) subsequently to removal of said supporting substrate (2).

11. The method as claimed in claim 1, further comprising the steps of winding said multilayer coating (1) is into rolls and storing said rolls for later use.

12. The method as claimed in claim 1, further comprising the step of cutting said multilayer coating (1) to size before the step of applying to said surface to be decorated (S).

13. The method as claimed in claim 1, further comprising the steps of drying said protective layer (3) and said at least one first decorative layer (4).

* * * * *